Patented Aug. 13, 1929.

1,724,818

UNITED STATES PATENT OFFICE.

ANDREW E. AVERRETT, OF SCHENECTADY, NEW YORK, ASSIGNOR TO GENERAL ELECTRIC COMPANY, A CORPORATION OF NEW YORK.

BRAZING ALLOY.

No Drawing. Application filed June 12, 1928. Serial No. 284,887.

The present invention relates to brazing alloys and more particularly to an alloy which may be substituted for ordinary, commercial, silver solder.

Silver solder contains approximately 50% silver, 33% copper, 17% zinc and has a melting point of about 775° C. This alloy has been found to be particularly desirable for use in brazing the copper conducting bars of induction motor rotors to the end rings thereof. On account of the high percentage of silver present in the alloy however, its cost is very high.

It is one of the objects of the present invention to provide a low cost brazing alloy which is suitable for use wherever ordinary commercial silver solder may be employed.

In carrying out my invention I employ approximately 54% by weight of copper, 36% zinc, 5% silver and 5% tin. These materials are melted in air or hydrogen in a suitable crucible and the alloy extruded in the form of a wire of relatively small diameter. This wire is held close to the junction of two metal structures to be brazed, and melted by a blow torch or other suitable means. The molten alloy will run between the metal parts and provide a firm junction between them.

This alloy costs about one-fifth as much as commercial silver solder, and, in addition, has a melting point of 785° C. which is only slightly higher than the melting point of silver solder.

The use of silver in the alloy tends to toughen it. Although tin has a tendency to make the alloy brittle it also lowers its melting point which is desirable since this point should be kept in the neighborhood of 800° C. or low enough so that the brazing alloy will flow readily on copper and brass.

The amounts of material specified as comprising the alloy may be varied slightly and, if desired, the tin could be omitted and 10% silver employed instead of 5% silver and 5% tin. While such a change would increase the strength of the alloy, it would raise its melting point and also increase the cost of the alloy.

What I claim as new and desire to secure by Letters Patent of the United States, is:

1. An alloy containing about 54% copper, about 36% zinc and an appreciable amount but not substantially more than 10% of silver.

2. A brazing alloy containing about 54% copper, 36% zinc, the remainder of the alloy consisting, except for minor impurities, of silver and tin.

3. A brazing alloy containing about 54% copper, 36% zinc, 5% silver and 5% tin.

In witness whereof, I have hereunto set my hand this 9th day of June, 1928.

ANDREW E. AVERRETT.